April 28, 1925.

H. RAUCHFUSS

LIQUID WEIGHING MACHINE

Filed Jan. 5, 1924

1,535,788

Inventor
Herman Rauchfuss.

By A. J. O'Brien

Attorney

Patented Apr. 28, 1925.

1,535,788

UNITED STATES PATENT OFFICE.

HERMAN RAUCHFUSS, OF ENGLEWOOD, COLORADO.

LIQUID-WEIGHING MACHINE.

Application filed January 5, 1924. Serial No. 684,533.

*To all whom it may concern:*

Be it known that I, HERMAN RAUCHFUSS, a citizen of the United States, residing at Englewood, county of Arapahoe, and State of Colorado, have invented certain new and useful Improvements in Liquid-Weighing Machines; and I do declare the following to a full, clear, and exact description of the invention, such as will enable others skilled in the art to which it appertains to make and use the same, reference being had to the accompanying drawings, and to the characters of reference marked thereon, which form a part of this specification.

This invention relates to weighing machines of the type employed in filling containers with a predetermined amount of liquid.

In the sale and distribution of goods such as honey, syrup, lard, etc., it has been found that the most satisfactory way in which they can be handled is by packing the same in tin cans or pails. When honey is the article to be packed, the difficulty is oftentimes increased by the fact that comb honey is first placed in the can and the balance is made up of strained honey.

Although my device depends for its operation on the weight of the liquid introduced in the can, this does not prevent it from being used in connection with material that is sold by measure, as, for example, by the gallon or fractions of gallons, as a certain volume will weigh a certain amount.

I will describe my device and explain its operation in connection with the packing of honey for which purpose it was primarily invented, although it is evident that it may be employed as well with other liquid products.

My invention, briefly described, consists of a valve mechanism that is connected to a storage tank. The device has a float-operated valve, which controls the admission of liquid into it in such a manner that the hydrostatic head at the delivery port of the device is maintained constant, regardless of the liquid level in the supply tank. The delivery port has a valve operatively related thereto. This valve is acted upon by a weight which tends to close the same. The weight is restrained by a catch which is released by weighing means whenever the required weight of material has been delivered to the container. Since there is always some liquid in the air between that in the can or pail and the lower end of the delivery port, it is necessary to provide means that will enable this, as well as the pressure due to the flowing liquid, to be compensated for. Since the distance from the top of the liquid in the full can and the delivery port varies with the size and shape of the can, as well as for other reasons, and since the consistency and therefore the rate of flow of the liquid varies with its temperature, it is necessary that the compensating means shall be such that it can be easily and quickly adjusted whenever the occasion requires. This has been provided for in my apparatus.

My invention and its mode of operation can be best understood when reference is had to the accompanying drawing in which the preferred embodiment thereof is shown, and in which.

The same reference numbers will be employed to designate the same parts throughout the several views.

Figure 1:
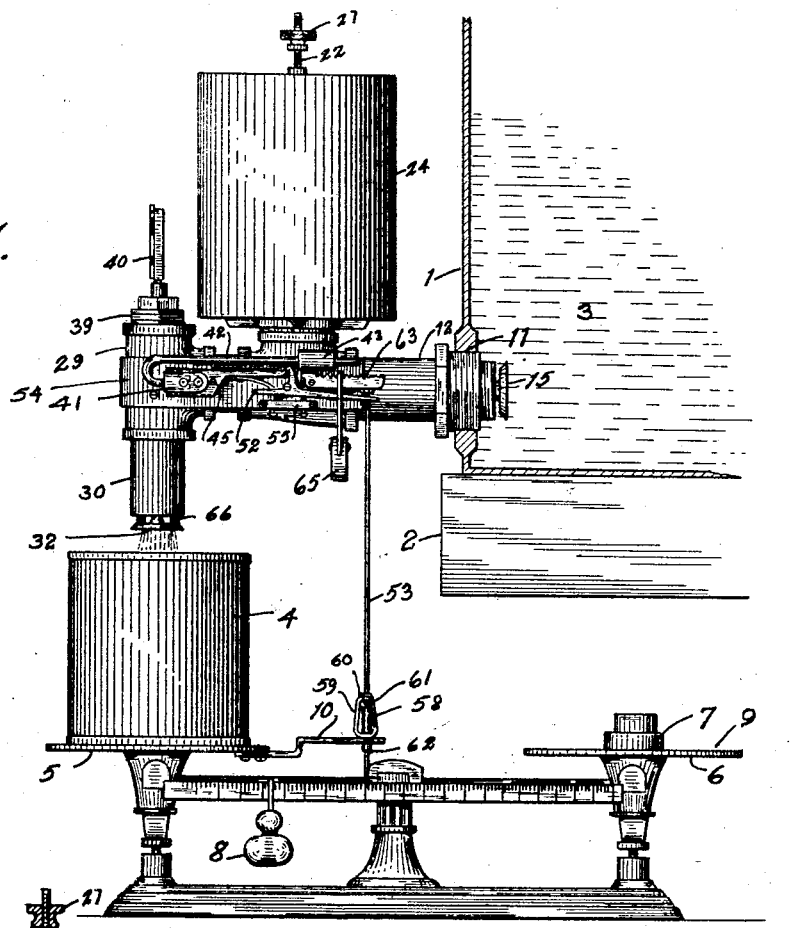
Fig. 1 is a side elevation of my device with portions thereof broken away to better disclose the construction.
Figure 3:
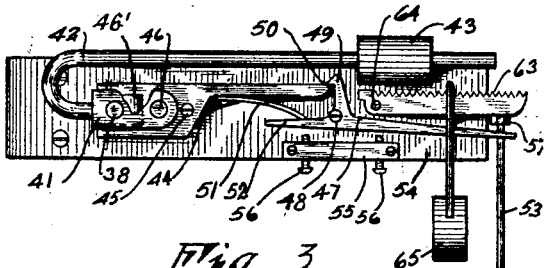
Fig. 3 is a detail on a somewhat larger scale.

Numeral 1 designates the supply tank which rests upon a support 2 and contains the strained honey which it is desired to pack in containers 4. The container 4 rests on one pan 5 of a common balance. On the opposite pan 6 I place weights 7 equal to the weight of liquid that I desire to introduce into the container. Before the weights 7 are put in place, I balance the scales with the container resting on pan 5. For this purpose I employ the weight 8 and any small weights and articles 9 placed on pan 6. For reasons which will be apparent, I secure to pan 5 a flat bar 10. The tank 1 has a threaded opening 11 near its bottom and to this my improved valve is secured. My valve as at present constructed, consists of a pipe 12 whose inner end is beveled as indicated at 13 so as to cooperate with the beveled edge 14 of the poppet valve 15 whose stem 16 extends through a guide 17 and is pivotally connected at 18 to the end of the vertical arm 19 of the bell crank lever which is pivoted at 20. Pivotally connected to the end of the horizontal arm 21 is a vertically extending rod 22. To the outer end of pipe 12 I have secured a T 23, which has its side opening arranged with its axis vertical. Threadedly connected at 23ᵃ with the T 23 is a reservoir 24. This reservoir has preferably a removable top 25 which is of such size that the hollow float 26 may be inserted into the reservoir through the opening in the top. The float 26 is threadedly connected with the rod 22 so that it can be adjusted vertically thereon. The rod 22 extends through the top of the reservoir and has a nut 27 threaded thereunto. It is evident that the up and down movement of the float 26 and the bar 22 will reciprocate the valve 15, thereby closing and opening the entrance into pipe 12. To the opposite side of the T 23, I connect a pipe 28 and to the end of this I secure another T 29. T 29 is secured, by its side opening, to the end of the pipe 28 and has the main body portion arranged in a vertical direction. A short pipe 30 is threaded into the lower opening of the T. The lower end of pipe 30 has its edge beveled, as indicated at 31, so as to cooperate with the correspondingly beveled edge of the valve 32, the stem of which passes through a guide 34 and has its upper end threadedly connected to a coupling 35, which is pivotally secured at 36 to the end of a lever 37. Lever 37 is nonrotatably secured to the shaft 38. To the upper end of the T, I secure a plug 39 which is perforated for the reception of a thermometer 40.

Figure 2:
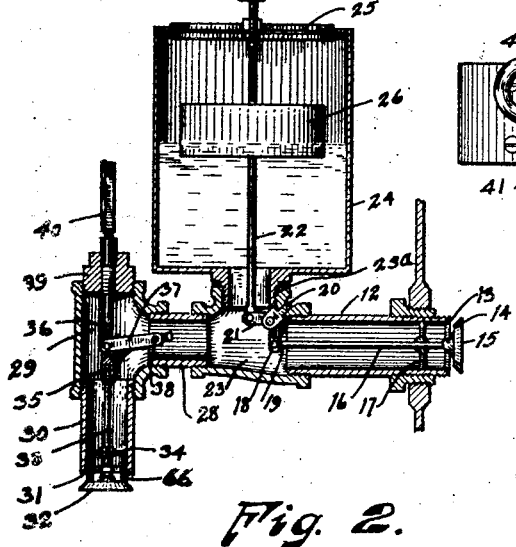
Fig. 2 is a vertical section through my valve.

Referring now to Fig. 2 it will be evident that if the valve 32 is closed, liquid from tank 1 will flow into the reservoir 24 and as it rises in the reservoir it will raise the float 26 until the valve 15 closes. If valve 32 is now opened so as to permit liquid to flow until valve 15 opens, as the valves are so adjusted that the rate of flow of liquid past valve 15 is greater than that past valve 32, it is evident that the float 25 will function to maintain valve 15 open only to the extent required to maintain a supply equal to that which flows out past valve 32. Constant head of liquid is therefore maintained in the reservoir, regardless of the level of the liquid in the supply tank.

Referring now more particularly to Fig. 1, we find that a member 41 is secured to the outer end of the shaft 38 and that a curved rod 42 is rigidly connected to the shaft 38 and this has a weight 43 adjustably clamped to it. The weight tends to rotate shaft 38 in a clockwise direction so as to move the arm 37 and the valve 32 upwardly for the purpose of closing the delivery port, which is the lower end of pipe 30. For the purpose of maintaining the delivery port open in opposition to the action of the weight 43, I have provided the following mechanism:

A lever 44 is pivotally mounted at 45 and is interconnected with member 41 by means of a pin 46 so that when member 41 moves clockwise, the lever 44 will move counter-clockwise. In order that lever 44 shall have only a limited movement about its pivot 46 its left hand end is provided with a notch 46′ that embraces the pivot 38. A second lever 47 is pivoted at 48 and has a portion 49 projecting upwardly. This portion has a hook 50 which is adapted to engage over the end of the lever 44, in the manner shown in the drawing, and serves to hold the same from turning. A spring 51 is secured to lever 44 and rests on an extension 52 of the lever 47. Lever 47 extends to the right for a distance of several inches and is provided with an opening for the reception of the rod 53. Fastened to the supporting plate or bracket 54 is a bar 55 through the ends of which adjusting screws 56 extend. These screws serve to limit the movement of the lever 47. The rod 53 extends through an opening in the extreme right end of the lever and is provided with a head 57. To the lower end of the rod 53 I secure a clamp 58, which consists of a strap 59 of resilient material with its ends 60 and 61 overlapping. A tubular member 62 is secured to the base of the strap. The ends 60 and 62 are perforated for the reception of the rod 53 which also passes through the tubular member 62. The latter extends through a hole in the end of strap 10 and the parts are so adjusted that while the scale is unbalanced as when the container is underweight, then the base portion of the strap 59 will rest on the upper surface of the flat bar 10. In this position and with the clamp 58 properly adjusted, the head 57 will not rest on or come in contact with the upper surface of the lever 47, but will have a position somewhat as shown in Fig. 1. A lever 63 is pivoted at 64 and has its upper edge serrated. A weight 65 is supported from lever 63 whose end rests upon the upper end of the rod 53. The resultant of the force exerted by the weight 65 is supported by rod 53 and transmitted to the scale pan. By varying the position of the weight on the arm 63, the force exerted on the pan 5 can be varied and by this means corrections can readily be made for the liquid in the air at the time valve 32 is closed, for variations in density and other variable factors. When sufficient liquid has flowed into the container 4 to cause the pan 5 to overcome the weights in pan 6 and move downwardly, the weight of rod 53, as well as that exerted by weight 65, will be transferred to the end of the lever 47 and move the latter downwardly sufficient to release the rod 44, thereby permitting weight 43 to function and close valve 32. The liquid will now rise in the reservoir and move the float 26 upwardly, thereby closing valve 15. The rate at which the liquid flows past the valve 32 depends upon the level of the liquid in the reservoir 24 and this can easily be controlled by the simple expedient of rotating the float on the rod 22. A spreader 66 is secured to the stem 33 and serves to divide the stream into two parts so as to prevent air bubbles from being entrained thereby.

The operation of the device is obvious from the above description, but in order to make the disclosure as full and clear as possible, the following description of the operation will be given:

Tank 1 is filled to any height with the fluid 3 which is to be packed in the cans 4. With valve 32 held in closed position by the action of the weight 43, liquid will flow into the reservoir 24 past valve 15 until the latter is moved to closed position by the action of the float 26. A pail or other suitable container is placed upon scale pan 5 and its weight compensated for, as above explained. Weights 7 are then placed in scale pan 6 to the value of the contents of the can when filled. This will, of course, move pan 5 upwardly, thereby moving rod 53 upwardly, raising the lever 63. The lever 42 is now turned in a counter-clockwise direction until the end of lever 44 is engaged by the hook 50. This opens valve 32 and liquid will flow into the container. When sufficient weight has been deposited in the container to overbalance the weight in the pan 6, then pan 5 moves downwardly. This permits the weight 65 and the weight of rod 53 to be transferred to the end of the lever 47, thereby releasing lever 44 and permitting weight 43 to fall and to close the valve 32. Weight 65 can readily be adjusted so that a perfect balance is obtained.

Having now described my invention, what I claim as new is:

1. In a weighing machine for filling containers with a predetermined weight of liquid, in combination, a liquid supply tank, a valve mechanism connected thereto, a scale, a container supported by said scale, said valve mechanism having an opening located directly above said container, a valve member operatively associated with said valve mechanism for closing said opening, means tending to move said valve member towards closing position, means comprising a latch member for holding said valve member in open position, said latch member having an opening for the reception of a control rod (53), said control rod having means for engaging the latch member and rendering said latch inoperative when the rod moves downwardly a predetermined distance, and means on the scale which cooperates with the rod and holds the latch engaging means out of contact with the latch until the weight of liquid in the container reaches a predetermined value and then permits the latch-engaging means to come into contact with the latch member and to be supported entirely thereby for the purpose of releasing the latch and permitting the valve member to move to closing position.

2. In a weighing machine for filling containers with a predetermined weight of liquid, in combination, a liquid supply tank, a valve mechanism connected thereto, a scale, a container supported by said scale, said valve mechanism having an opening located directly above said container, a valve member operatively associated with said valve mechanism for closing said opening, means tending to move said valve member towards closing position, means comprising a latch member for holding said valve member in open position, said latch member having an opening for the reception of a control rod (53), said control rod having means for engaging the latch member and rendering said latch inoperative when the rod moves downwardly a predetermined distance, means on the scale which cooperates with the rod and holds the latch until the weight of liquid in the container reaches a predetermined value and then permits the latch-engaging means to come into contact with the latch member and to be supported entirely thereby for the purpose of releasing the latch and permitting the valve member to move to closing position, and an adjustable weight resting upon the upper end of the control rod while the valve is open.

3. In a weighing machine for filling containers with a predetermined weight of liquid, in combination, a supply tank, a scale, a container on the scale, valve-controlled mechanism for conveying liquid from the tank to the container, said mechanism having an exit opening directly above the container, a valve member for controlling the flow of liquid through said opening, means tending to move said valve member to closing position, means comprising a latch member for holding said valve member in open position, a valve member near the point where liquid enters the valve-controlled mechanism, a float chamber between said valve and said exit opening, a float in said chamber, means connecting said float to said last-named valve member for opening and closing the same in accordance with the level of the liquid in the float chamber, and means operatively associated with the scale and the latch member for moving the latter when the container has attained a predetermined weight, said last-named means being supported by the scale while the liquid is flowing into the container and by the latch member after the latch has operated.

4. In a device for delivering predetermined weights of liquids to a container, a supply tank, a container, a scale upon which said container rests, a valve mechanism secured to the tank, said mechanism having a delivery port located over the container, a reservoir connected to said valve mechanism between the delivery port and the tank, a float in said reservoir, a valve operatively associated with the entrance to the valve mechanism, means connecting said valve and float so that an upward movement of the latter moves the valves towards closing position, and a downward movement moves the valve towards open position, a second valve operatively associated with the delivery port, means tending to move said second valve towards closed position, means for holding said valve in open position, means comprising a trigger device operatively connected to the scale for rendering said holding device inoperative when the portion of the scale to which it is connected moves, and means for adjusting for the amount of liquid between the container and the valve at the time the latter closes.

5. In a device for delivering predetermined weights of liquids to a container, a supply tank, a container, a scale upon which said container rests, a valve mechanism secured to the tank, said mechanism having a delivery port located over the container, a reservoir connected to said valve mechanism between the delivery port and the tank, a float in said reservoir, a valve operatively associated with the entrance to the valve mechanism, means connecting said valve and float so that an upward movement of the latter moves the valves towards closing position, and a downward movement moves the valves towards open position, a second valve operatively associated with the delivery port, means tending to move said second valve towards closed position, means for holding said valve in open position, means comprising a trigger device operatively connected to the scale for rendering said holding device inoperative when the portion of the scale to which it is connected moves, and means for adjusting for the amount of liquid between the container and the valve at the time the latter closes, said means comprising a rod resting on the scale, a lever having one end pivotally connected to the valve mechanism and the other end resting on the rod and a weight movably connected to said lever.

In testimony whereof I affix my signature.

HERMAN RAUCHFUSS.